US 6,608,729 B1

(12) United States Patent
Willems et al.

(10) Patent No.: US 6,608,729 B1
(45) Date of Patent: Aug. 19, 2003

(54) INTELLIGENT POWER MANAGEMENT OF DISC DRIVES

(75) Inventors: Frank Dwight Willems, Longmont, CO (US); Jonathan Harrington Ormsby, Boulder, CO (US); Clifton James Williamson, Soquel, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 277 days.

(21) Appl. No.: 09/645,107

(22) Filed: Aug. 23, 2000

Related U.S. Application Data
(60) Provisional application No. 60/150,714, filed on Aug. 25, 1999.

(51) Int. Cl.[7] .............................................. G11B 19/02
(52) U.S. Cl. ......................................................... 360/69
(58) Field of Search ................................ 360/69, 78.04, 360/77.02, 74.1

(56) References Cited

U.S. PATENT DOCUMENTS

| 5,167,024 A | 11/1992 | Smith et al. ................. 713/322 |
| 5,396,635 A | 3/1995 | Fung .......................... 713/323 |
| 5,452,277 A | 9/1995 | Bajorek et al. ............ 369/53.18 |
| 5,473,238 A | 12/1995 | Latham, II et al. .......... 318/560 |
| 5,481,733 A | * 1/1996 | Douglis et al. .............. 395/750 |
| 5,493,670 A | 2/1996 | Douglis et al. .............. 713/324 |
| 5,517,649 A | 5/1996 | McLean ....................... 713/323 |
| 5,521,896 A | 5/1996 | Bajorek et al. ............ 369/53.18 |
| 5,544,138 A | 8/1996 | Bajorek et al. ............ 369/53.42 |
| 5,691,948 A | * 11/1997 | Sakabe ......................... 365/227 |
| 5,774,292 A | 6/1998 | Georgiou et al. ......... 360/73.03 |
| 5,872,669 A | 2/1999 | Morehouse et al. ........... 360/69 |

FOREIGN PATENT DOCUMENTS

| EP | 0 737 909 A2 | 10/1996 |
| EP | 0 751 512 A2 | 1/1997 |
| EP | 0 825 519 A1 | 2/1998 |

* cited by examiner

Primary Examiner—David Hudspeth
Assistant Examiner—Mitchell Slavitt
(74) Attorney, Agent, or Firm—Merchant & Gould P.C.

(57) ABSTRACT

Herein is disclosed a method and apparatus for controlling power consumption of a disc drive in a portable computer based upon statistical characteristics of recent user disc access. This is accomplished by a disc drive that initially instantiates a set of thresholds, each of which govern transition into a corresponding power consumption mode. Next, the disc drive measures, at intervals, the time span since the disc drive was last issued a command. Prior to receipt of a new command by the disc drive, the disc drive is progressively transitioned into lower power consumption modes as the measured time span since the last command was issued meets each successive threshold. Following receipt of a new command by the disc drive, the threshold governing transition in to the next lower power consumption mode is adjusted based upon the measured time span.

13 Claims, 9 Drawing Sheets

INTELLIGENT POWER MANAGEMENT OF DISC DRIVES

RELATED APPLICATIONS

This application claims the benefit of the filing date of United States Provisional Patent Application Ser. No. 60/150,714 filed Aug. 25, 1999 and entitled "INTELLIGENT POWER MANAGEMENT OF DISC DRIVES."

FIELD OF THE INVENTION

This application relates to hard disc drives and more particularly to an apparatus and method for intelligently controlling the power consumption of disc drives.

BACKGROUND OF THE INVENTION

Portable computers operate on battery power. Accordingly, the duration for which a portable computer may operate before its battery must be recharged is governed by the level of current which is drawn from the battery, and the total charge the battery is capable of storing. Because it is desirable to produce a portable computer which possesses the capacity to operate for long periods of time before its battery must be recharged, development efforts have focused both on maximizing the total charge carried by such a battery, and on minimizing the current drawn from the battery. Since power is directly related to the square of current, power consumption and current consumption will be referred to interchangeably.

One way in which a computer system may be designed to draw less current from its battery is to provide it with a means for automatically identifying dormant subcomponents, so that those subcomponents might be put in a low power consumption state or turned off completely. For example, a computer display may be configured to automatically disable itself, so as to cease drawing upon the battery, upon discerning that the computer has received no user input for a given period of time. Disc drives in portable computers may be similarly controlled in order to avoid unnecessarily drawing current from the computer's battery.

Although a disc drive will generally not be entirely powered down while a portable computer is operating, it may be commanded to enter progressively lower power consumption states as time transpires since the last time the drive has been commanded to undertake an action (such as read or write data). For example, if a given amount of time transpires since the drive has executed a command, the drive may power down some of its control circuitry, thereby entering a low power consumption state. Assuming even more time transpires without the drive being commanded to undertake an operation, the drive may additionally turn off its servo capabilities, allowing its heads to float at mid-diameter, thereby entering an even lower power consumption state. In very low current consumption states, the heads may be loaded on to the ramp, and the spindle motor may be turned off. The precise definition of each power consumption state (i.e., what components and/or capabilities are and are not activated) is a matter of choice.

It should be noted that as a disc drive enters progressively lower power consumption states, it will require progressively longer periods of time to return to a full-power state so that it will once again be able to execute a command. Longer recovery periods are required to return from lower power consumption states because more sub-circuits must be re-powered, the spindle motor may have to be returned to proper speed, and because the heads might be required to be unloaded from the ramp.

In the past, disc drives in portable computers have been designed to transition into progressively lower power consumption states based upon the time elapsed since the last time a command was sent to the disc drive. In such a disc drive, a timer is reset and begins to run with each command that is sent to the drive. As the timer meets a given threshold, a corresponding state is entered. This principle is illustrated by FIG. 1. In FIG. 1, three different low current consumption states are shown. While a disc drive is executing commands, it is in a full-power state. As soon as execution ceases, the timer value meets a first threshold (the threshold being set at 0 ms), and a first low current consumption state is entered. Similarly, when the timer value meets the second threshold, a second low current consumption state is entered. The second low current consumption state requires the disc drive to draw less current from the battery than does the first low current consumption states, as is indicated by its lower position on the vertical axis. Each threshold corresponds to entry into a given state, with each successive state requiring that less current be drawn from the system's battery. In a conventional disc drive, these various thresholds are set at static values.

Under the conventional scheme of power management just described, it is likely for an undesirable situation to occur: the disc drive may decide to transition to a lower current consumption mode just before the host issues a new command to the disc drive. In this scenario, the drive will enter the lower current consumption mode and then immediately return to full-power mode in order to service the new command. Two undesirable effects are caused by behaving thusly. First, extra power is consumed in transitioning in and out of the lower current consumption state. Second, I/O performance of the disc drive is degraded, because time is consumed in transitioning in and out of the lower consumption state.

SUMMARY OF THE INVENTION

The method and apparatus in accordance with the present invention solves the aforementioned problem and other problems by controlling power consumption of a disc drive in a computer based upon statistical characteristics of recent user disc access. This is accomplished by a disc drive that initially instantiates a set of thresholds, each of which govern transition into a corresponding power consumption mode. Next, the disc drive measures, at intervals, the time span since the disc drive was last issued a command. Prior to receipt of a new command by the disc drive, the disc drive is progressively transitioned into lower power consumption modes as the measured time span since the last command was issued meets each successive threshold. Following receipt of a new command by the disc drive, the thresholds surrounding the measured time span are adjusted based upon the measured time span.

The invention has the benefit of allowing the disc drive to learn the disc access characteristics of a particular application. Knowledge of that information permits the thresholds governing transition between power consumption modes to be dynamically calculated so as to optimize transitions between power consumption modes.

These and various other features as well as advantages which characterize the present invention will be apparent from a reading of the following detailed description and a review of the associated drawings.

DETAILED DESCRIPTION

Figure 2:
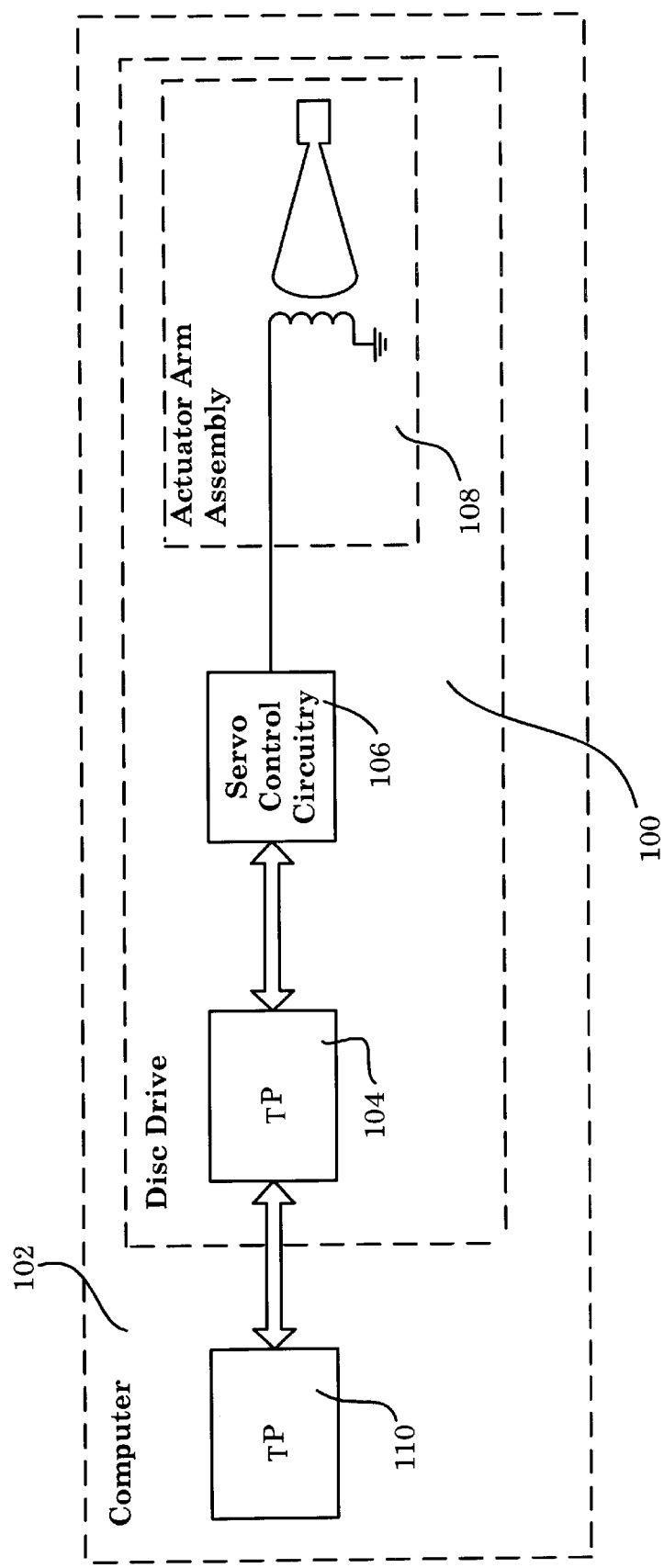
FIG. 2 depicts an embodiment of a disc drive in accordance with the present invention.

A disc drive 100 constructed in accordance with a preferred embodiment of the present invention is shown in FIG. 2. The disc drive 100 is contained within a portable computer 102. The disc drive 100 contains an embedded microprocessor 104, servo control circuitry 106, and an actuator arm assembly 108. The embedded microprocessor 104 receives commands from the host microprocessor 110, and controls the actuator arm assembly 108, via the servo control circuitry 106, in response to a host command.

Assuming, for the sake of illustration, that the host microprocessor 110 issues a write command, this command would be received by the embedded microprocessor 104. The embedded microprocessor 104 would communicate with the servo control circuitry 106, which would cause the actuator arm assembly 108 to move over the proper track location and then write the appropriate data to the disc. Importantly, while an operation is being performed, such as a write operation, the disc drive consumes full power.

Embedded microprocessor 104 may be programmed to put the disc drive 100 into various power consumption modes. While a command is being executed, the disc drive 100 must be in a full power consumption mode. Immediately upon completion of a command, however, the disc drive 100, may transition in a first low power consumption mode. If the drive is idle for a certain duration, the disc drive 100 may transition into a second low power consumption mode (thereby consuming even less power than when in the first low power consumption mode). The required period of idleness for a disc drive 100 to enter a given low power consumption mode is called a "threshold". A disc drive 100 is able to consume less than full power, and therefore be in a certain low power consumption mode, by deactivating certain hardware. An important consideration with respect to deactivating hardware is that time and power are consumed in the process of reactivating the previously disabled hardware, as will need to be done in order to service a command.

Figure 3:
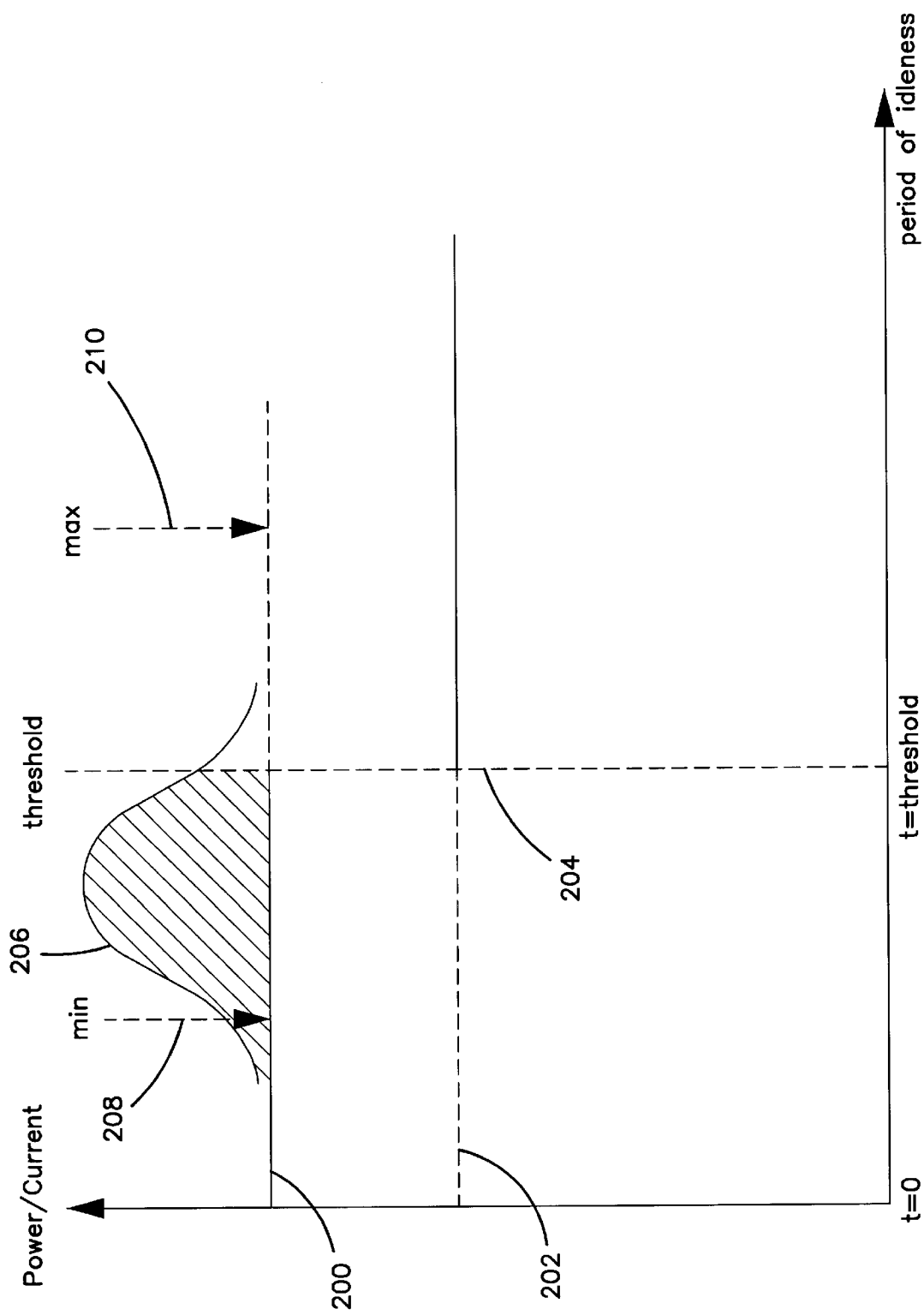
FIG. 3 depicts a dynamic threshold determined based upon a distribution of recent idle periods.

FIG. 3 illustrates the principle that a threshold may be determined based upon the distribution of recent idle periods surrounding a given threshold. In FIG. 3, two low current consumption modes 200, 202 are depicted on a Cartesian plane, with the x-axis representing period of idleness of the disc drive 100, and the y-axis representing power or current consumption of the disc drive 100. Low current consumption mode 202 has been extended as a dashed line so that its intersection with the y-axis may be seen. Since low current consumption mode 202 intersects the y-axis at a point lower than low current consumption mode 200, a disc drive operating in low current consumption mode 202 would consume less power than a disc drive operating in low current consumption mode 200. Accordingly, low current consumption mode 202 is a lower current consumption mode than low current consumption mode 200.

As illustrated, low current consumption mode 200 begins a time t=0, and terminates at time t=threshold, at which point the disc drive would transition to low current consumption mode 202. Time t=threshold is representative of the period of idleness (time between commands issued from the host microprocessor 110 to the disc drive 100) required for a transition into low current consumption mode 202 to occur, and is depicted by the dashed threshold line 204. The threshold 204 is frequently recalculated, rather than static.

Distribution 206 serves as the basis for calculating the threshold 204. Distribution 206 is a probability distribution derived from the last n periods of idleness which terminated while disc drive 100 was in low current consumption mode 200 or low current consumption mode 202. Herein, each of the n periods of idleness in distribution 206 are referred to as "periods of idleness surrounding the threshold." Distribution 206 is a normal distribution which approximates the distribution of the last n periods of idleness. A normal distribution is completely determined by the mean, $\mu$, and the standard deviation, $\sigma$. Distribution 206 is the normal distribution with the same mean and standard deviation as the distribution of the last n periods of idleness. The area of the cross-hatched portion of distribution 206 represents the probability that a period of idleness less than the threshold 204 will occur. Therefore, the threshold 204 may be determined by requiring that it be set at a point such that there is an x% probability that a given period of idleness will be less than it. By appropriately choosing n (the number of sample periods of idleness in the distribution) and x (the probability that a period of idleness will be less than the threshold), the threshold may be dynamically set at a point where it is unlikely that the disc drive 100 will transition into a lower power state 202, only to immediately receive a command and have to return to full power mode to service that command. The threshold 204 is dynamic because the sample periods of idleness making up the distribution 206 (the last n periods of idleness falling in low current consumption modes 200, 202) change as the host microprocessor 110 issues commands to the disc drive 100. Because distribution 206 changes as the host microprocessor issues commands, the threshold 204 will also change. Values for x and n should be determined empirically to yield maximum performance. However, reasonable values are n=30 periods of idleness, and x=90%.

Because threshold 204 is based upon distribution 206, it is dependent upon each of the n samples within the distribution 206. Due to that dependency, the threshold 204 might be unduly influenced by an outlying sample, resulting in a threshold value that is extremely high or extremely low. To guard against this, a maximum threshold value 210 and a minimum threshold value 208 are imposed. If the calculated threshold 204 falls beneath the minimum threshold value 208, the minimum threshold value 208 will supplant the calculated value. Similarly, if the calculated threshold 204 falls above the maximum threshold value 210, the maximum threshold value 210 will be used in place of the calculated value.

Figure 4:
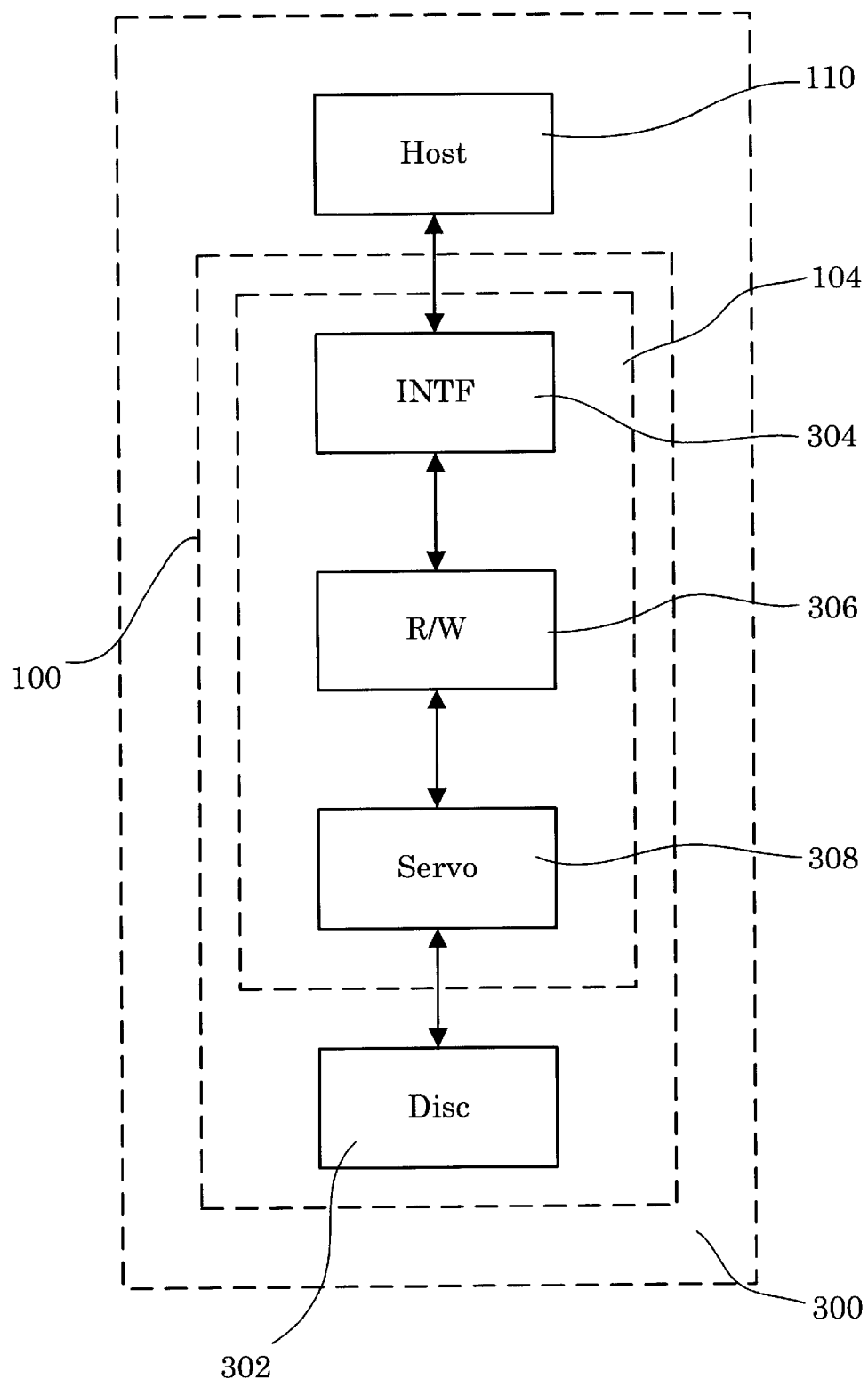
FIG. 4 depicts another embodiment of a disc drive in accordance with the present invention.

FIG. 4 illustrates a computer 300 designed in accordance with one embodiment of the present invention. The computer 300 of FIG. 4 possesses a microprocessor 110 which communicates with a second microprocessor 104 embedded within the disc drive 100. The embedded microprocessor 104 interfaces with the disc 302, reading and writing data thereto.

Figure 1:
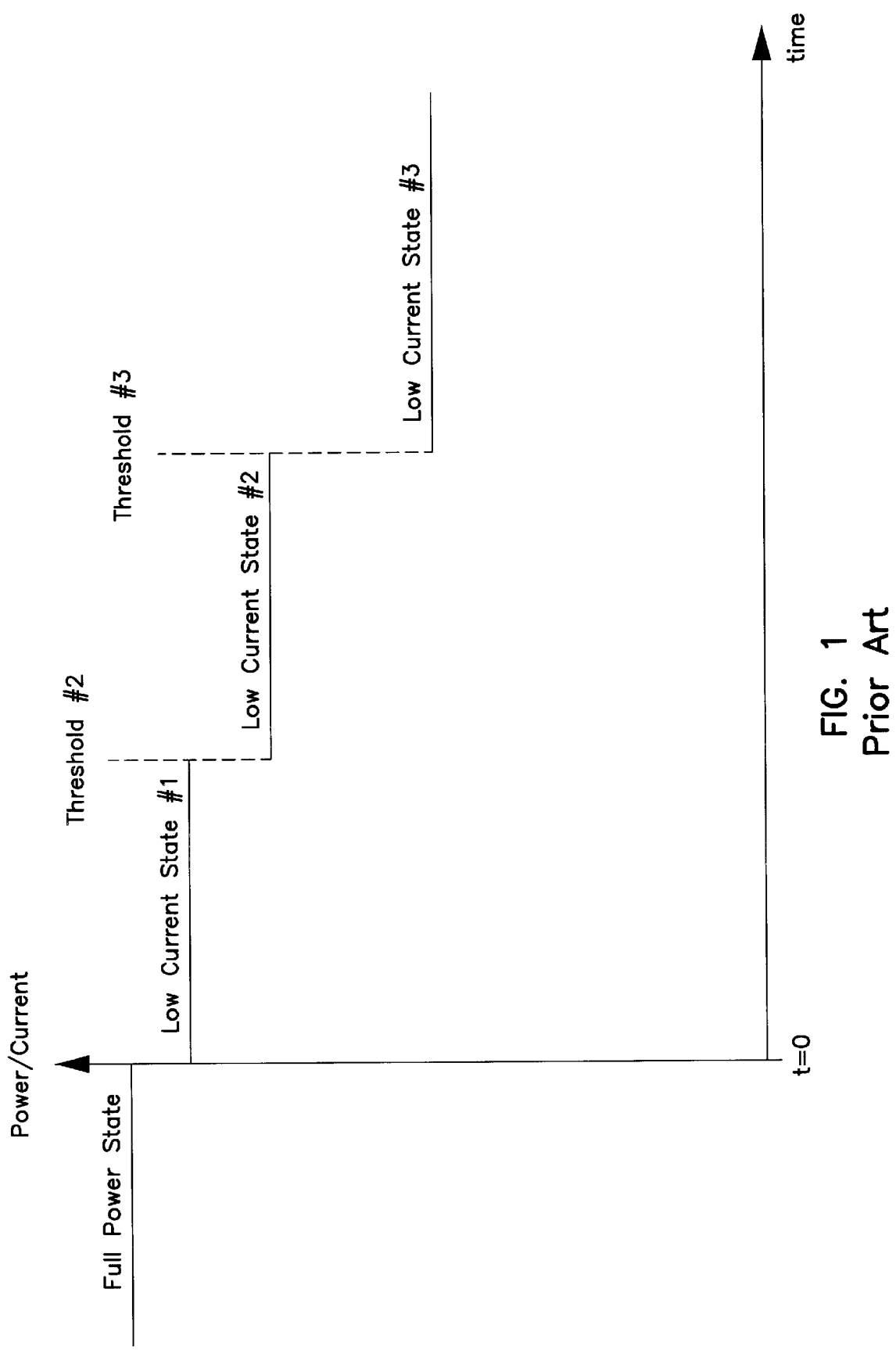
FIG. 1 is a power consumption profile for a disc drive in the prior art.

Three different layers of firmware are resident on the embedded microprocessor 104: Host Interface layer 304, Read/Write layer 306, and Servo layer 308. The Host Interface layer 304 handles commands originating from the host microprocessor 110. The Host Interface layer 304 communicates with the Read/Write layer 306 to instruct the Read/Write layer 306 as to the location of the disc to be addressed. The Read/Write layer 306 communicates with the Servo layer 308, instructing it as to the physical position that the actuator should achieve in order to service the current command. Finally, the Servo layer 308 interacts with the servo control circuitry 106 (shown in FIG. 1) to accomplish moving the actuator arm to the desired location.

Firmware that effects the threshold adjustment described with reference to FIG. 3 operates on the embedded microprocessor 104 within the Host Interface layer 304. Individual electronic modules could embody the invention in a manner analogous to its expression through the firmware operating on the embedded microprocessor 104.

Whether the invention be embodied in firmware or hardware, the flowcharts and function calling hierarchies of FIGS. 5, 6, 7, 8, and 9 depict its operation.

Figure 5:
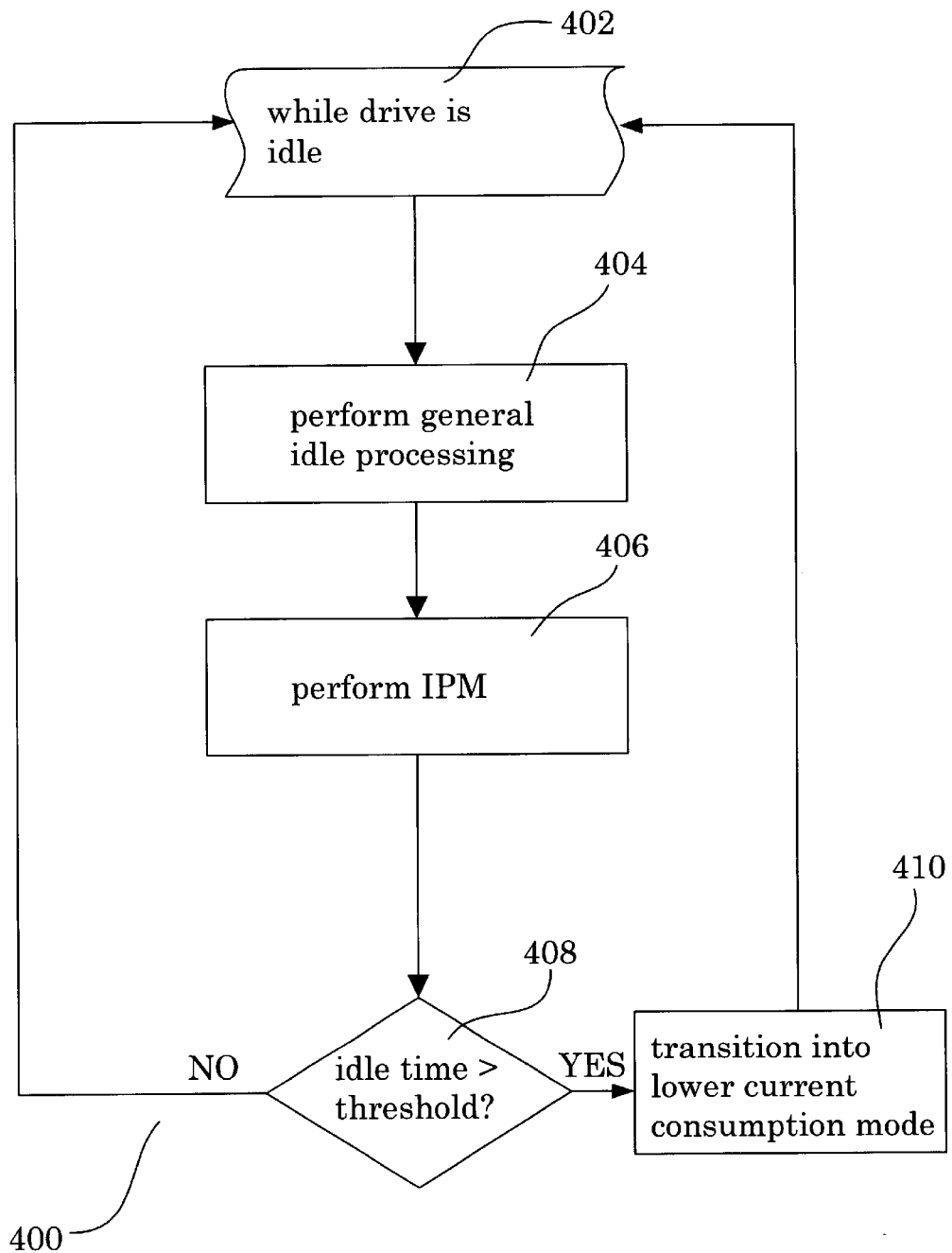
FIG. 5 depicts a series of operations conducted during periods of idleness by a disc drive in accordance with the present invention.

FIG. 5 is a flowchart of an idle processing loop 400 that is executed by the embedded microprocessor 104 during periods of disc drive 100 idleness. The idle processing loop 400 is entered upon the completion of servicing a command issued to the disc drive 100, as is depicted by the conditional operation 402. The idle processing loop 400 is exited upon issuance of a command to the disc drive 100 by the host microprocessor 110.

In general idle processing operation 404, the embedded microprocessor performs various forms of general disc drive maintenance. An example of disc drive maintenance which is performed in general idle processing operation 404 is off-line scanning of disc sectors for the purpose of identifying bad blocks. Upon completion of general idle processing operation 404, control is passed to intelligent power management (IPM) operation 406.

In IPM operation 406, all of the necessary steps for calculation of the various thresholds are performed. The functions performed herein include: updating circular queues of length n which hold the last n periods of idleness relevant to the calculation of a given threshold (the periods of idleness surrounding the threshold), as discussed with reference to FIG. 3; initialization of the queues; calculation of the various thresholds themselves. IPM operation 406 is shown in greater detail in FIG. 6. Upon completion of IPM operation 406, control is passed to idle time query operation 408.

In idle time query operation 408, the current duration of idleness is compared against the threshold required to transition into the next lower current consumption mode. If the current idle duration is greater than the aforementioned threshold, transition operation 410 is entered, and the disc drive 100 is transitioned into the next lower current consumption mode. If, on the other hand, the current idle duration does not exceed the aforementioned threshold, the drive remains in its present current consumption mode. In either case, the idle processing loop 400 is iterated until a new command is issued to the disc drive 100 by the host microprocessor 110.

To summarize, the idle processing loop 400 is executed while the disc drive is idle (not executing a command issued by the host microprocessor 110). Assuming the host microprocessor issues many commands in rapid succession, many commands may be executed before the idle processing loop is re-entered. Because the dynamic threshold values are computed within IPM operation 406, threshold values may not be recalculated after each command. Rather, a new threshold value will be computed when the drive has been idle long enough for the IPM operation 406 to be executed. The new threshold value being computed will be based upon the last n periods of idleness surrounding the threshold to be computed. Accordingly, rather than the distribution 206 made up of the last n periods of idleness simply having one new sample period of idleness in it when a new threshold is calculated, it may have as many as k new sample periods of idleness, wherein k represents the number of commands issued (and therefore the number of periods of idleness collected) since the last time IPM operation 406 was executed.

Figure 6:
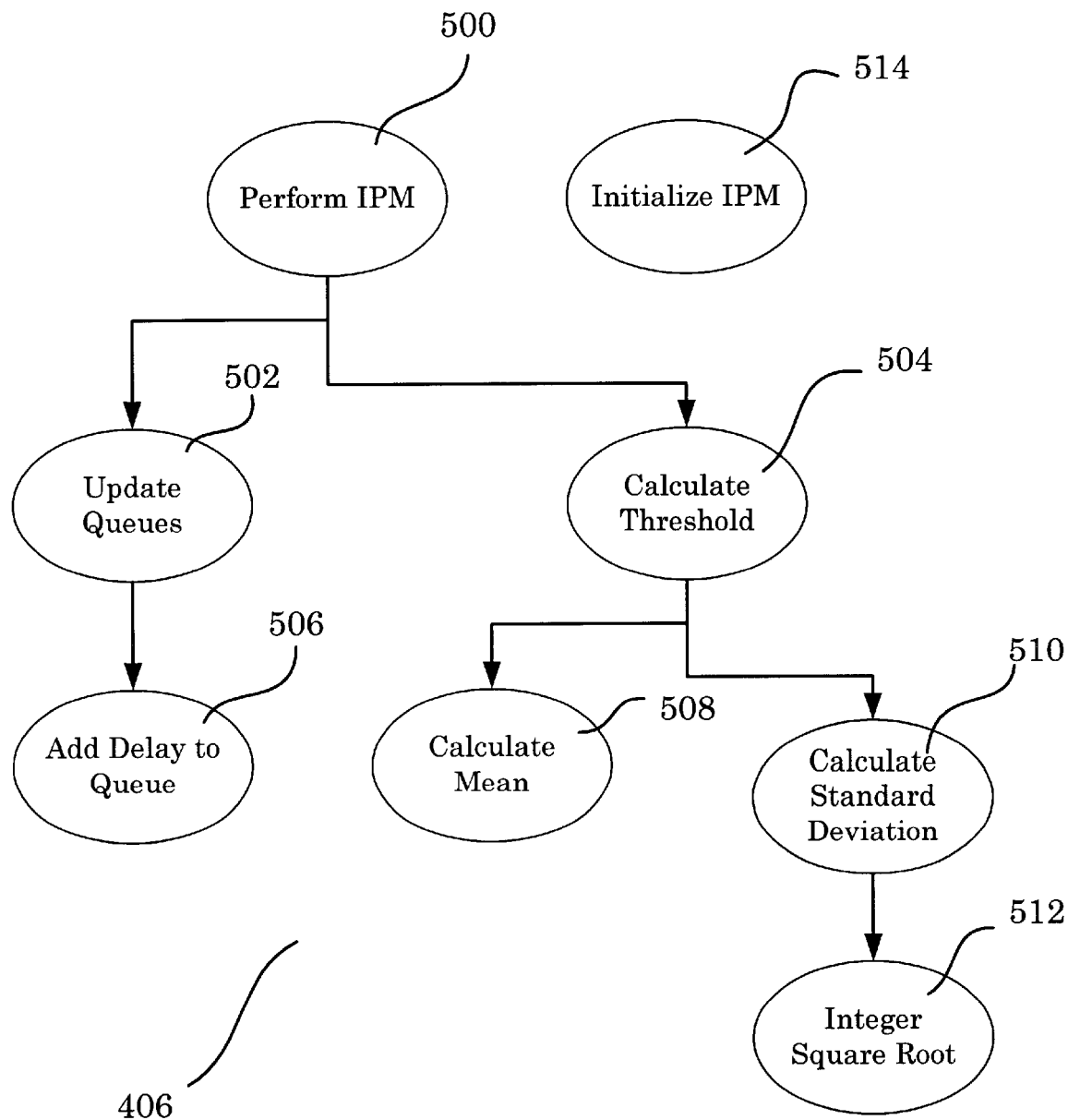
FIG. 6 depicts a function calling hierarchy that embodies one aspect of the present invention.

FIG. 6 illustrates the function calling hierarchy of the IPM operation 406 introduced in FIG. 5. As can be seen in FIG. 6, the IPM operation 406 may be embodied by a Perform IPM function 500, the purpose of which is to calculate new threshold values based upon recent command delays. The first function called within the IPM operation 406 is the Update Queues function 502. The operation of the Update Queues function 502 can best be understood with reference to FIGS. 7A and 7B.

Figures 7A, 7B:
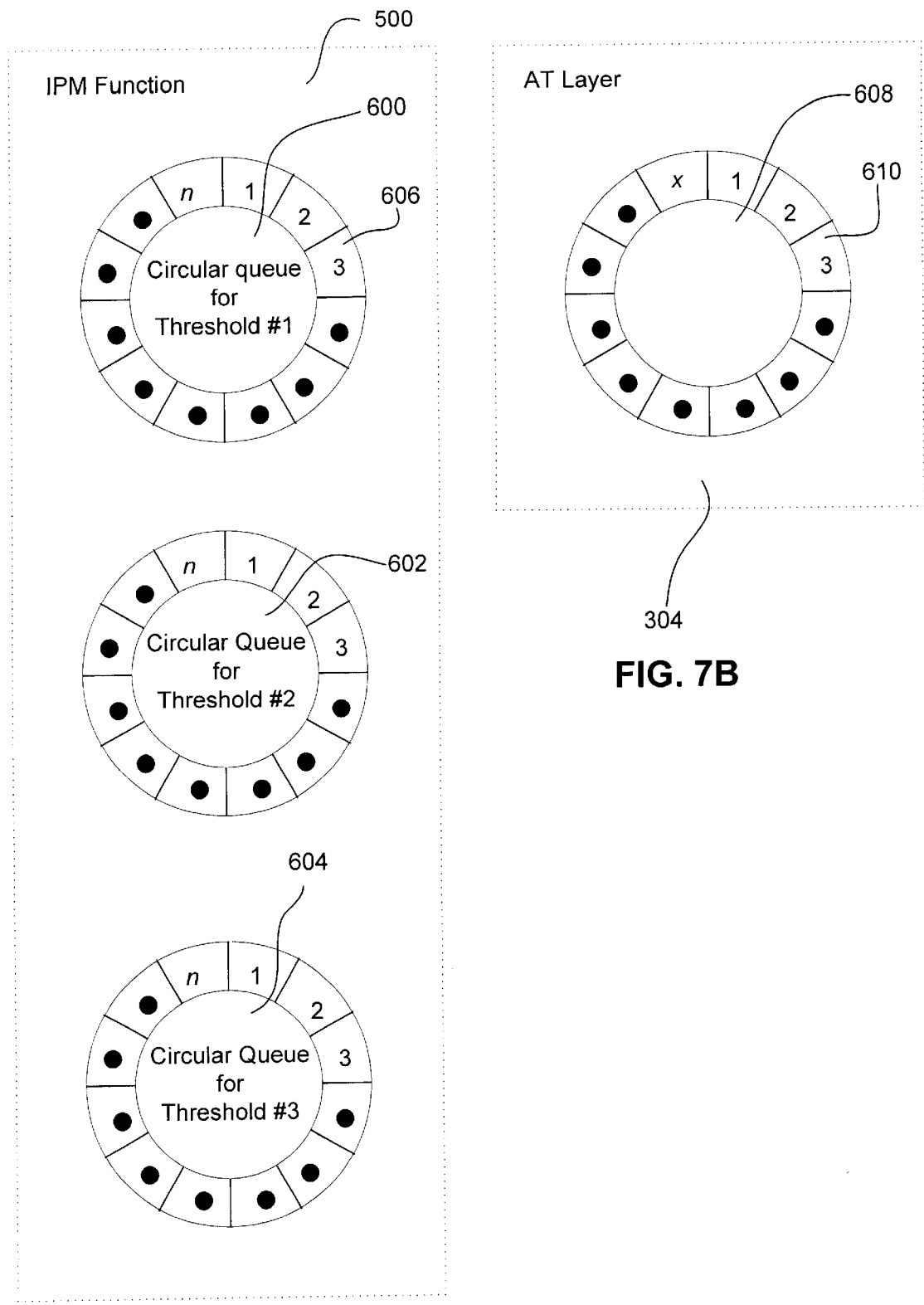
FIGS. 7A and 7B depicts various sets of circular queues which embody one aspect of the present invention.

FIGS. 7A and 7B depicts a set of circular queues 600, 602, 604 which are maintained by the Update Queues function 502. There exists one circular queue for each threshold. Each circular queue 600, 602, 604 has n slots 606. Each circular queue 600, 602, 604 is used to store a set of idle periods that surround a corresponding threshold. Each slot 606 of a given circular queue is used to store a recent idle period surrounding a given threshold, as discussed with reference to FIG. 3. If there are n slots in a given circular queue, then the distribution 206 (discussed with reference to FIG. 3) that serves as the basis for determining a threshold is derived from n sample periods of idleness, each sample period of idleness being stored in a slot 606. Each of the n slots are filled consecutively until all n slots are filled, at which point the first slot is again used for storage.

The periods of idleness which are stored in the slots 606 are derived from entries stored in a circular command queue 608 maintained within the Host Interface layer 304. Each command received by the Host Interface layer 304 from the host microprocessor 110 is stored in a slot 610 in the circular command queue, along with a timestamp signifying the time at which the command was received. By subtracting consecutive timestamps stored in the circular command queue 608, periods of idleness can be determined for storage in a slot 606 within a circular queue 600, 602, 604 maintained by the Update Queues function 502. After a period of idleness is determined via subtraction of timestamps, the Update Queues function 502 determines which thresholds bound that period of idleness, and thereafter commands the Add Delay to Queue function 506 to add the given period of idleness to the circular queues 600, 602, 604 corresponding to those thresholds. For the sake of illustrating the operation of the Add Delay to Queue function 506, refer to FIG. 1 and assume that the thresholds therein are dynamic rather than static; if a given period of idleness were to fall within low current consumption state #2, that period of idleness would be added to the circular queues corresponding threshold #2 and threshold #3 since those thresholds bound that period of idleness. The Update Queues function 502 will command the Add Delay to Queue function 506 to add to an appropriate circular queue 600, 602, 604 each of the k periods of idleness contained in the circular command queue 608 which were not contained in that queue 608 the last time the Update Queues function 502 was executed.

One purpose of the IPM operation 406 is to initialize the circular queues 600, 602, 604 upon powering up the portable computer 102. This operation is performed by the Initialize IPM function 514, and is accomplished by storing maximum threshold values 210 in each slot 606 of each circular queue 604, thereby ensuring that all thresholds begin at their maximum values to provide highest performance when the portable computer 102 is powered up.

Returning to FIG. 6, the Calculate Threshold function 504 is called after the Update Queues function 502 has completed execution. The Calculate Threshold function 504 will calculate the threshold needed for governing transition of the disc drive 100 into the next lower current consumption mode. As discussed with reference to FIG. 3, the threshold value will be determined based upon the desired probability that a period of idleness fall beneath the threshold, and will also be determined based upon the mean and standard deviation of the distribution 206 surrounding the threshold. The Calculate Threshold function 504 obtains the mean of the distribution surrounding the threshold of interest by calling the Calculate Mean function 508. The operation of the Calculate Mean function 508 is illustrated by FIG. 8.

Figure 8:
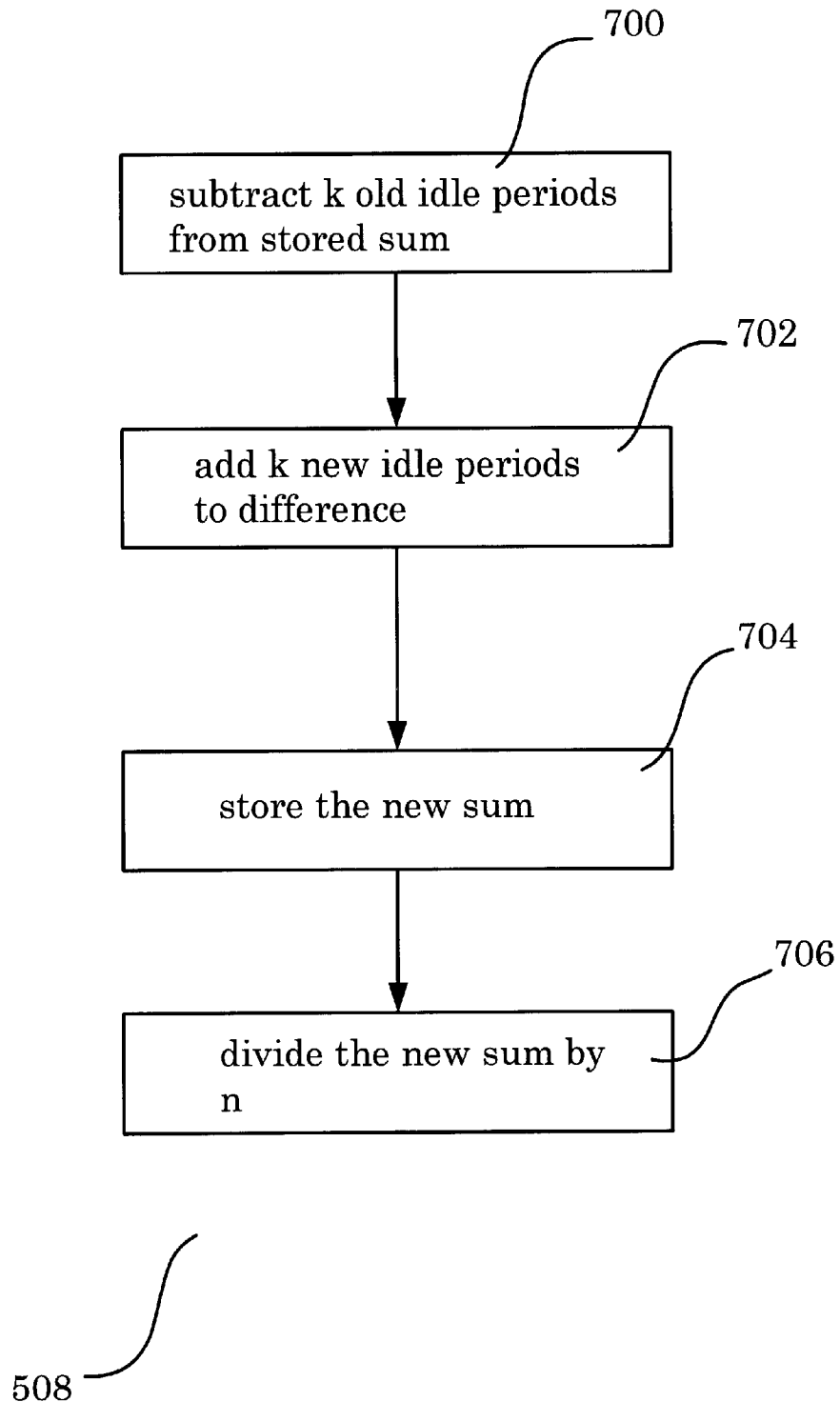
FIG. 8 depicts a series of steps which permit efficient calculation of a mean of a distribution.

FIG. 8 depicts the operation of the Calculate Mean function 508. The purpose of this function is to calculate the mean of the distribution surrounding the threshold under consideration. In one embodiment, the Calculate Mean function 508 accomplishes this task by summing together each of the n sample periods of idleness contained in the circular queue 600, 602, 604 corresponding to the threshold under consideration, and then dividing by n:

$$\mu = [X_1 + X_2 + \ldots x_n]/n,$$

wherein $\mu$ represents the mean, $x_i$ represents a sample period of idleness, and n represents the total number of sample periods of idleness in the distribution 206 surrounding the threshold of interest. In an alternate embodiment, depicted in FIG. 8, the mean is more efficiently calculated. In FIG. 8, it is assumed that k new periods of idleness were added to the circular queue 600, 602, 604 corresponding to the threshold under consideration by the Update Queues function 502. The efficient process for calculating the mean circumvents the necessity of performing n addition operations to sum each of the n sample periods of idleness making up the distribution. Instead, the sum of the n sample periods of idleness previously having made up the distribution is used as a starting point, from which the k oldest sample periods of idleness will be subtracted as shown in operation 700. In operation 702, the k new sample periods of idleness are added to the difference produced in operation 700. Next, in operation 704, the sum calculated in operation 702 is stored in order to allow efficient calculation of the mean in the future (it is this stored value that will be used as the starting point in operation 700 the next time the function is entered). Finally, in operation 706, the sum calculated in operation 702 and stored in operation 704 is integer divided by n so as to yield the integer portion of the mean of the distribution.

Figure 9:
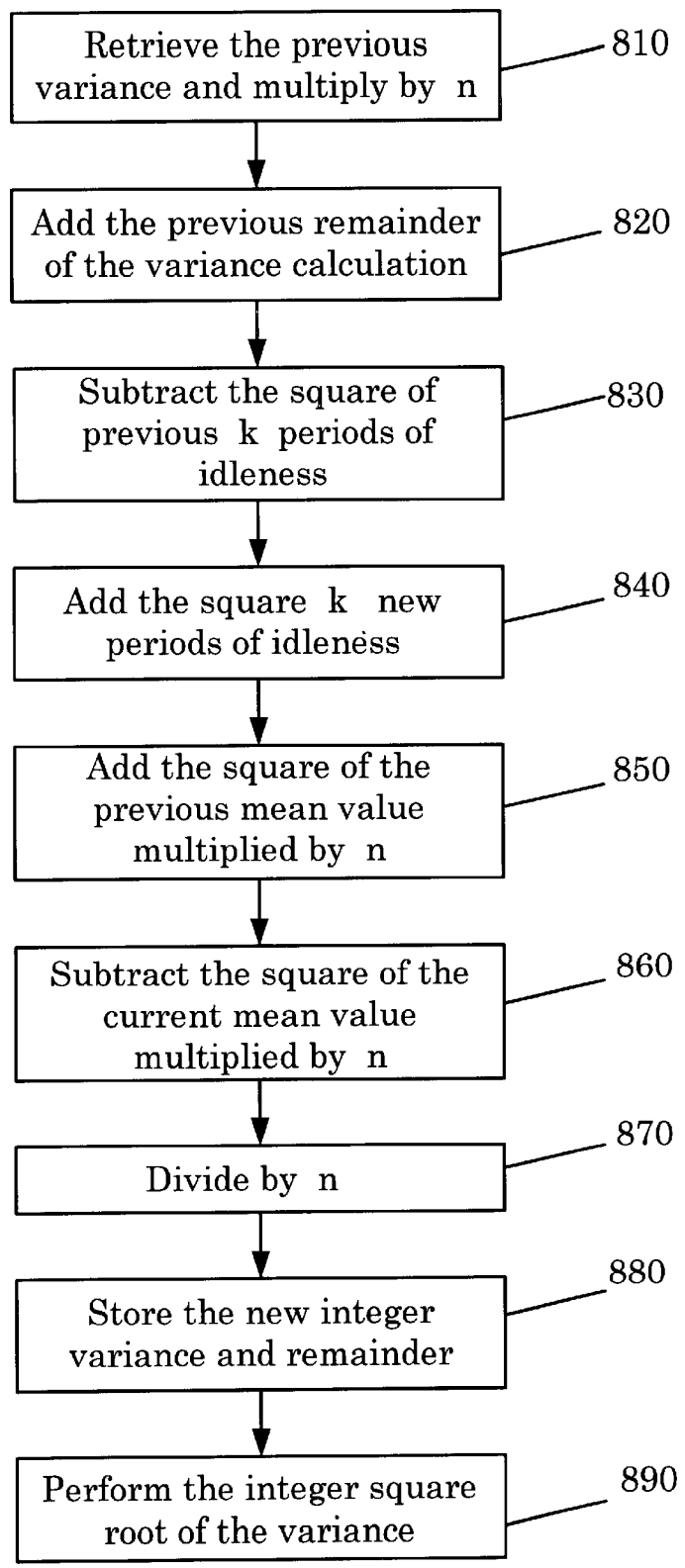
FIG. 9 depicts a series of steps which permit efficient calculation of a standard deviation of a distribution.

As mentioned above, The Calculate Threshold function 504 must also calculate the standard deviation of the distribution surrounding the threshold of interest. This may be done by calling another function to perform the standard deviation calculation. In FIG. 6, the standard deviation calculation is performed by the Calculate Standard Deviation function 510, the operation of which is illustrated in FIG. 9.

In one embodiment, a standard deviation of a distribution is computed by calculating the difference between the old, or previous, variance multiplied by the size of the circular queue 600, 602, 604 and the square of the old, or previous, periods of idleness, adding the square of the new periods of idleness, adding the product of the size of the circular queue 600, 602, 604 and the difference between the old, or previous, squared mean value and the new squared mean value, and taking the square root of the result:

$$\sigma_{new} = (\sigma^2_{old} n - x_1^2 + x^2_{k+1} + \mu^2_{old} n - \mu^2_{new} n)^{1/2}$$

where $\sigma$ represents the standard deviation, $x_1$ represents an old period of idleness, $x_{k+1}$ represents a new period of idleness, $\mu_{old}$ is the old mean value, $\mu_{new}$ is the new mean value, and n represents the size of the circular queue 600, 602, 604. Just as in the Calculate Mean Function 508, it is desirable to calculate the standard deviation using a minimum number of operations. In FIG. 9, it is assumed that k new periods of idleness were added to the circular queue 600, 602, 604 corresponding to the threshold under consideration by the Update Queues function 502. An efficient manner of calculating a standard deviation depicted in FIG. 9 commences by retrieving the integer portion of the variance of the n sample periods of idleness previously having made up the distribution (the variance of a distribution is the square of its standard deviation) and then multiplying it by n, illustrated by retrieval operation 810. To understand this operation 810, it is important to note that the variance which is retrieved is an integer value, but that the actual statistical variance of the distribution results from dividing the sum of each of the n constituent terms by n, meaning that the actual statistical variance may actually be a fractional number. In the first addition operation 820, the previous remainder of the variance calculation is added to the variance value. In the first subtraction operation 830, the square of the previous k periods of idleness are subtracted from the quantity resulting from operation 820, and the result and control is passed to the second addition operation 840. In addition operation 840, the square of the new k periods of idleness are added to the result of the previous operation 830. Within the third addition operation 850 the previous mean value is squared, then multiplied by n and then added to the result of the previous addition operation 840. Control is passed to the second subtraction operation 860. In the second subtraction operation 860, the new mean value is squared then multiplied by n, and the result is subtracted from the result of the previous operation 850. In the division operation 870, the value produced in operation 860 is divided by n. Next the store operation 880 is initiated and therein the new integer variance and remainder are stored in memory. Finally, the square root operation 890 is initiated, which includes performing an integer square root operation upon the new variance value, thereby yielding the desired integer standard deviation.

Returning to FIG. 6, once the Calculate Threshold function 504 has directed the calculation of the mean and standard deviation of the distribution surrounding the threshold to be calculated, the threshold value itself may finally be calculated based upon the formula:

$$b = \sigma Z(p) + \mu,$$

wherein b represents the threshold relative to the previous threshold, and Z(p) represents a value looked up from a table based upon p, the desired probability that a period of idleness fall beneath the threshold. The table from which Z(p) is looked up follows:

| p | Z (p) | p | Z (p) |
|---|---|---|---|
| 0.99 | 2.326341928 | 0.74 | 0.64334472 |
| 0.98 | 2.053748176 | 0.73 | 0.612812983 |
| 0.97 | 1.880789569 | 0.72 | 0.582840585 |
| 0.96 | 1.750686351 | 0.71 | 0.553384325 |
| 0.95 | 1.644853 | 0.70 | 0.524401003 |
| 0.94 | 1.554772098 | 0.69 | 0.49584969 |
| 0.93 | 1.475791578 | 0.68 | 0.467698555 |
| 0.92 | 1.405073817 | 0.67 | 0.439913492 |
| 0.91 | 1.340754352 | 0.66 | 0.412462668 |
| 0.90 | 1.281550794 | 0.65 | 0.385321073 |
| 0.89 | 1.226528639 | 0.64 | 0.358459147 |
| 0.88 | 1.174987574 | 0.63 | 0.331854153 |
| 0.87 | 1.126390998 | 0.62 | 0.30548108 |
| 0.86 | 1.080320544 | 0.61 | 0.279319465 |
| 0.85 | 1.036432877 | 0.60 | 0.25334657 |
| 0.84 | 0.994457423 | 0.59 | 0.227545343 |
| 0.83 | 0.954164534 | 0.58 | 0.201894181 |
| 0.82 | 0.91536549 | 0.57 | 0.17637376 |
| 0.81 | 0.877896582 | 0.56 | 0.150969299 |
| 0.80 | 0.841621386 | 0.55 | 0.125661472 |
| 0.79 | 0.806421667 | 0.54 | 0.100433226 |
| 0.78 | 0.772192834 | 0.53 | 0.075269782 |
| 0.77 | 0.738846211 | 0.52 | 0.050154085 |
| 0.76 | 0.706302217 | 0.51 | 0.0025069085 |
| 0.75 | 0.674490366 | 0.50 | 0 |

To summarize one embodiment of the present invention, a method of controlling power consumption of a disc drive (such as 100) in a portable computer (such as 102) based upon statistical characteristics of recent user disc access may be realized by executing the following acts. First, an initial set of thresholds is instantiated, each threshold governing a transition into a corresponding power consumption mode. The initial set of thresholds may be arrived at by defining a minimum (such as 208) and maximum (such as 210) value for each threshold (such as 204), and setting each threshold (such as 204) to its maximum value. Next, the time span since the disc drive (such as 100) was last issued a command is measured. Prior to receipt of a new command by the disc drive (such as 100), the disc drive (such as 100) is transitioned into successively lower power consumption modes, as the measured time span meets the threshold (such as 204) corresponding to the power consumption mode to be entered. Following receipt of a new command by the disc drive (such as 100) one threshold is adjusted based upon the measured time span. The adjustment may be accomplished by consecutively entering the measured time span between the new command and the last issued command into the circular queues (such as 600, 602, 604) which bound a given period of idleness, so as to contain a distribution (such as 206) within a circular queue (such as 600, 602, 604). The current power consumption mode is determined, so that the threshold (such as 204) governing entry into the next lowest power consumption state may be calculated. The calculation is performed by fitting the measured time spans in the circular queue (such as 600, 602, 604) corresponding to the threshold governing entry into the immediately lower power consumption mode to a normal distribution, and then looking up a threshold, from a table, based upon a standard deviation and a mean which correspond to the normal distribution to which the measured time spans fit, and based upon a percentage capture value. If, during calculation of a threshold (such as 204), a new command is received from the host microprocessor (such as 110), the threshold adjustment procedure is aborted.

In a disc drive (such as 100), an embedded microprocessor (such as 104) is used to execute firmware responsible for transitioning the disc drive (such as 100) into various power consumption modes. The firmware performs the steps summarized above. The embedded microprocessor (such as 104) is operably coupled to a host microprocessor (such as 110) and to servo control circuitry (such as 106).

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for controlling power consumption of a disc drive based upon statistical characteristics of recent user disc access, comprising acts of:
   (a) instantiating an initial set of thresholds, each threshold governing a transition into a corresponding power consumption mode, each successive power consumption mode requiring less power than the preceding power consumption mode;
   (b) measuring, at intervals, a time span since the disc drive was last issued a command;
   (c) prior to receipt of a new command by the disc drive, transitioning the disc drive into a subsequent lower power consumption mode as the measured time span meets the threshold corresponding to the power consumption mode to be entered; and
   (d) following receipt of a new command by the disc drive, adjusting a threshold, based upon the measured time span.

2. The method of claim 1 wherein act (a) comprises acts of:
   (a)(i) for each threshold, defining a minimum and maximum value; and
   (a)(ii) setting each threshold to its maximum value.

3. The method of claim 1 wherein act (d) comprises acts of:
   (d)(i) consecutively entering the measured time span between the new command and the last issued command into one or more of a set of circular queues, each circular queue associated with a threshold; and
   (d)(ii) adjusting one or more thresholds based upon the values in the circular queue associated with the threshold.

4. The method of claim 3 wherein threshold adjustment is aborted upon reception of a second new command.

5. The method of claim 3 wherein act (d)(ii) comprises acts of:
   (d)(ii)(a) determining a current consumption power mode; and
   (d)(ii)(b) calculating a threshold governing entry into the immediately lower power consumption mode.

6. The method of claim 5 wherein act (d)(ii)(b) further comprises acts of:
   (d)(ii)(b)(i) fitting the measured time spans in the circular queue corresponding to the threshold governing entry into the immediately lower power consumption mode to a normal distribution; and
   (d)(ii)(b)(ii) looking up a threshold, from a table, based upon a standard deviation and a mean which correspond to the normal distribution to which the measured time spans fit, and based upon a percentage capture value.

7. An apparatus for controlling power consumption of a disc drive based upon statistical characteristics of recent user disc access, comprising:

(a) servo control circuitry;

(b) an embedded microprocessor in the disc drive, the embedded microprocessor receiving commands from a host microprocessor, the embedded microprocessor operably coupled to the servo control circuitry, and the embedded processor being programmed to (i) instantiate an initial set of thresholds, each threshold governing a transition into a corresponding power consumption mode, each subsequent power consumption mode requiring less power than the preceding power consumption mode;

(ii) measure, at intervals, a time span since the disc drive was last issued a command;

(iii) prior to receipt of a new command by the disc drive, transition the disc drive into a subsequent lower power consumption mode as the measured time span meets the threshold corresponding to the power consumption mode to be entered; and (iv) following receipt of a new command by the disc drive, adjust a threshold based upon the measured time span.

8. The apparatus of claim 7 wherein the embedded microprocessor is programmed to instantiate a set of thresholds by being further programmed to (i) for each threshold, define a minimum and maximum value; and (ii) set each threshold to its maximum value.

9. The apparatus of claim 7 wherein the embedded microprocessor is programmed to adjust one threshold by being further programmed to (i) consecutively enter the measured time span between the new command and the last issued command into one or more of a set of circular queues, each circular queue related to a threshold; and (ii) adjust a threshold based upon the values in the circular queue related to the threshold.

10. The apparatus of claim 7 wherein the embedded microprocessor is programmed to abort threshold adjustment upon reception of a second new command.

11. The apparatus of claim 9 wherein the embedded microprocessor is programmed to adjust a threshold by being further programmed to (i) determine the current consumption power state; and (ii) calculate a threshold governing entry into the immediately lower power consumption mode.

12. The apparatus of claim 11 wherein the embedded microprocessor is programmed to calculate the threshold by being further programmed to (i) fit the measured time spans in the circular queue related to a threshold governing entry into the immediately lower power consumption mode to a normal distribution; and (ii) look up a threshold, from a table, based upon a standard deviation and a mean which correspond to the normal distribution to which the measured time spans fit, and based upon a percentage capture value.

13. An apparatus for controlling power consumption of a disc drive based upon statistical characteristics of recent user disc access, comprising:

(a) disk drive control circuitry; and (b) means for adjusting the thresholds which govern entry of the disc drive into power consumption modes, based upon statistical characteristics of recent user disc access.

* * * * *